United States Patent
Rencs et al.

(10) Patent No.: US 9,904,644 B2
(45) Date of Patent: Feb. 27, 2018

(54) SYSTEMS AND METHODS OF USING AN SPI CONTROLLER

(71) Applicant: Goodrich Corporation

(72) Inventors: Erik V. Rencs, Carlisle, MA (US); Jennifer S. Richardson, Westford, MA (US); Scott W. Ramsey, Northbridge, MA (US)

(73) Assignee: Goodrich Corporation, Charlotte, NC (US)

( * ) Notice: Subject to any disclaimer, the term of this patent is extended or adjusted under 35 U.S.C. 154(b) by 332 days.

(21) Appl. No.: 14/461,086

(22) Filed: Aug. 15, 2014

(65) Prior Publication Data

US 2015/0100716 A1 Apr. 9, 2015

Related U.S. Application Data

(60) Provisional application No. 61/888,768, filed on Oct. 9, 2013.

(51) Int. Cl.

| G06F 13/36 | (2006.01) |
|---|---|
| G06F 13/00 | (2006.01) |
| G06F 13/14 | (2006.01) |
| G06F 1/00 | (2006.01) |
| G06F 1/04 | (2006.01) |
| G06F 1/24 | (2006.01) |
| G06F 11/00 | (2006.01) |
| G06F 5/06 | (2006.01) |
| G06F 13/40 | (2006.01) |

(Continued)

(52) U.S. Cl.
CPC .......... *G06F 13/4027* (2013.01); *G06F 13/16* (2013.01); *G06F 13/385* (2013.01); *Y02B 60/1228* (2013.01); *Y02B 60/1235* (2013.01)

(58) Field of Classification Search
CPC ......................... G06F 13/4282; H04L 12/4625
USPC .......................................... 710/110, 305, 316
See application file for complete search history.

(56) References Cited

U.S. PATENT DOCUMENTS

| 5,745,533 A | * | 4/1998 | Asada | ........................ G06F 1/10 |
| | | | | 327/161 |
| 5,875,313 A | * | 2/1999 | Sescila, III | .......... G06F 13/4059 |
| | | | | 710/30 |

(Continued)

*Primary Examiner* — Faisal M Zaman
(74) *Attorney, Agent, or Firm* — Locke Lord LLP; Scott D. Wofsy; Alexander Viderman

(57) ABSTRACT

A system for managing internal-computer system communications including a processor, an SPI controller, an interconnector, and an SPI cluster containing multiple SPI interfaces, with the SPI interfaces being connected to one or more devices in the computer system or environment. The SPI cluster includes SPI interfaces that can convert communications to/from a plurality of device's formats to serialized digital formats suitable for ingest and actuation for the SPI controllers. The interconnector may use a differentially, optically, galvanometrically, inductively coupled driven wire and to enable communications between the SPI cluster constituents and the SPI controller. The SPI controller manages communications to the SPI interfaces that act as coordinated intermediates for device control and communications, thus insulating the computer system's processor from the increased workload of managing all internal system communications.

12 Claims, 9 Drawing Sheets

(51) Int. Cl.
*G06F 13/16* (2006.01)
*G06F 13/38* (2006.01)

(56) References Cited

U.S. PATENT DOCUMENTS

| | | | | |
|---|---|---|---|---|
| 5,935,257 | A * | 8/1999 | Nishimura | G06F 1/10 713/503 |
| 5,987,619 | A * | 11/1999 | Hamamoto | G06F 1/10 713/401 |
| 6,380,787 | B1 * | 4/2002 | Forbes | G06F 1/10 326/30 |
| 7,359,407 | B1 * | 4/2008 | Mattos | H04L 25/14 370/509 |
| 7,472,208 | B2 * | 12/2008 | Rothman | G06F 11/3664 709/213 |
| 7,765,269 | B2 * | 7/2010 | Kanekawa | G06F 13/4217 709/208 |
| 8,650,304 | B2 * | 2/2014 | Anderson | H04L 69/18 709/227 |
| 2005/0134353 | A1 * | 6/2005 | Tahara | G06F 1/10 327/295 |
| 2007/0143512 | A1 * | 6/2007 | Kuo | G06F 13/4291 710/110 |
| 2007/0255974 | A1 * | 11/2007 | Gilday | G06F 1/10 713/503 |
| 2009/0138694 | A1 * | 5/2009 | Le | G06F 9/4403 713/2 |
| 2009/0147710 | A1 * | 6/2009 | Choi | H04W 84/18 370/310 |
| 2010/0054345 | A1 * | 3/2010 | Yamamoto | H04L 12/10 375/257 |
| 2010/0088441 | A1 * | 4/2010 | Peterson | B60L 1/003 710/110 |
| 2011/0060856 | A1 * | 3/2011 | Huang | G06F 13/4291 710/110 |
| 2011/0225339 | A1 * | 9/2011 | Chen | G06F 13/387 710/313 |
| 2011/0252577 | A1 * | 10/2011 | Kim | D06F 37/203 8/137 |
| 2012/0072628 | A1 * | 3/2012 | Crockett | G06F 13/4291 710/110 |
| 2012/0131247 | A1 * | 5/2012 | Mok | G06F 13/4291 710/110 |
| 2012/0233376 | A1 * | 9/2012 | Anbai | G06F 13/1668 710/316 |
| 2012/0260018 | A1 * | 10/2012 | Lin | G06F 13/4022 710/316 |
| 2013/0246684 | A1 * | 9/2013 | Cohen | G06F 13/4282 710/316 |
| 2013/0332633 | A1 * | 12/2013 | Carney | G06F 13/4291 710/48 |
| 2015/0074319 | A1 * | 3/2015 | Spence | G06F 13/4291 710/310 |

* cited by examiner

SYSTEMS AND METHODS OF USING AN SPI CONTROLLER

FIELD OF THE INVENTION

The present invention relates to internal computer-system communications between processing elements and peripheral devices, and more particularly, to using a Serial Peripheral Interface (SPI) management system to manage the same.

BACKGROUND OF THE INVENTION

In certain environments, particularly in real-time, low-power applications and/or time-critical heterogeneous environments, the load balancing on a processor, even high-speed multi-core processors, can be inefficient, poorly timed and difficult to program. Further, some internal computer-system communications methods have distance and timing limitations and/or restrictions that minimize their usefulness in larger systems.

The SPI protocol is a widely used protocol for data transfer between integrated circuits (ICs), in particular, between a host processor and one or more peripheral devices. The SPI protocol is a synchronous protocol which requires a defined timing for correct operation. The SPI protocol is typically used for short distance, single master communication, for example in embedded systems, sensors, and the like.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system and method for managing internal-computer system communications in an SPI management system computer system are disclosed. The SPI management system utilizes an SPI cluster electrical interface as an intermediary between an SPI controller and a collocated cluster of SPI interface components (referred to hereinafter as "SPI Cluster") connected to one or more peripheral devices.

In another aspect a method for utilizing an SPI controller in an SPI management system includes a processor configuring an SPI controller configuration data structure. The method further includes the processor running one or more initialization routines to initialize the plurality of SPI interfaces and to initialize the one or more peripheral devices. The method further includes the processor sending a command to the SPI controller requesting the SPI controller to execute a plurality of program instructions to control and process communication between the processor and the one or more peripheral devices. The method further includes the SPI controller executing the plurality of program instructions responsive to receiving the command from the processor.

BRIEF DESCRIPTION OF THE DRAWINGS

So that those having ordinary skill in the art, to which the present invention pertains, will more readily understand how to employ the novel system and methods of the present certain illustrated embodiments, the embodiments thereof will be described in detail herein-below with reference to the drawings, wherein.

DETAILED DESCRIPTION OF CERTAIN EMBODIMENTS

Figure 1:
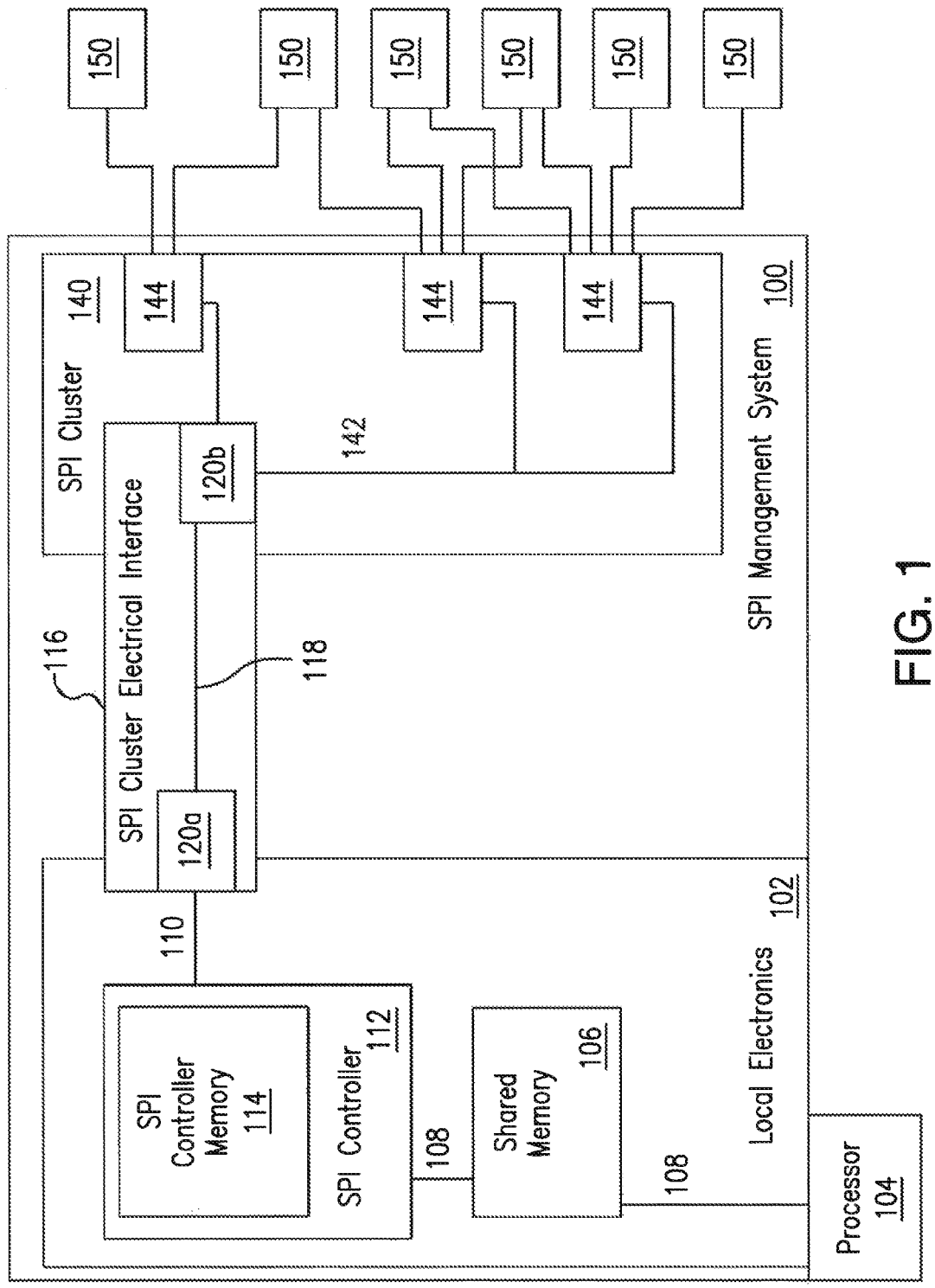
FIG. 1 illustrates a system diagram of an embodiment of a device management system configured to manage SPI-enabled devices.

The below described embodiments are directed to a device management system and method for managing intra-system communications in which a component or a feature that is common to more than one illustration is indicated with a common reference. In one embodiment, the device management system is a Serial Peripheral Interface (SPI) management system that includes an SPI controller, an SPI Cluster Electrical Interface and an SPI cluster. It is to be appreciated that the below described embodiments are not limited in any way to what is shown in the Figures, and instead, can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art to relating to below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli (and equivalents known to those skilled in the art) and reference to "the signal" includes reference to one or more signals (and equivalents thereof known to those skilled in the art), and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, for download from a remote machine, etc. One skilled in the art will appreciate further features and advantages of the certain embodiments described herein, thus the certain illustrated embodiments are not to be understood to be limited by what has been particularly shown and described, except as indicated by the appended claims.

As will be appreciated from the below description of certain illustrated embodiments, the methods described herein off-load work from a computer processor by functioning as an intermediary, managing communication from and to devices in a computer system and/or in a computing environment.

As used herein, the term "SPI management system" refers to a set of SPI related components. In one embodiment, the SPI management system includes an SPI controller, an SPI cluster electrical interface and an SPI cluster. In some embodiments, the SPI management system can have a plurality of SPI controllers. It should be noted that in a preferred embodiment each of SPI controllers connects to one and only one SPI cluster electrical interface and thus only one SPI Cluster. According to an embodiment of the present invention, the SPI management system may further include one or more processors that can interact with each of the plurality of SPI controllers via shared memory interfaces. As used herein, the term "processor" is to be broadly construed to include any type of embedded processor.

As used herein, the term "SPI interface" refers to any component that converts commands and other types of communications from a standard SPI format to another electrical or physical or information format. Examples of such SPI interfaces include, but not limited to, SPI to Controller Area Network ("CAN"), SPI to digital-to-analog ("D/A") converter, SPI to mirror scan angle, SPI to Gyroscope Data, and the like.

As used herein, the term "SPI Cluster" refers to a set of collocated SPI interfaces that share a SPI cluster electrical interface with one SPI controller.

As used herein, the term "device" and/or "peripheral device" is to be broadly construed to include any type of the physical entity that the SPI Interface is connected to. In general, peripheral devices using SPIs may include, but not limited to, various types of sensors (temperature, pressure, etc.) with analog or digital outputs, motor controllers, signal mixers, encoders, potentiometers, power transistors, LCD controllers, accelerometers, CAN controllers, USB controllers, amplifiers.

Referring now to FIG. 1, there is illustrated a system diagram of a device management system, configured to manage a plurality of devices, in which the present invention may be embodied. In one embodiment, an SPI management system 100 preferably includes a computing device's processor(s) 104 and a plurality of devices 150 attached to an SPI cluster 140. For example, six devices 150 may be connected to the SPI cluster 140, via a plurality of SPI interfaces 144. In various embodiments the devices 150 may provide and receive digital communication, provide and receive serial communication, provide analog input that needs to be converted to digital format, receive analog output that has been converted from digital format, provide temperature readings, and the like. In one exemplary embodiment, SPI management system 100 may also include shared memory block 106, shared memory connecting means (e.g., wire) 108, SPI controller connecting means 110, SPI controller 112 and SPI cluster electrical interface 116. It is noted that for ease of illustration purposes only six peripheral devices 150 are illustrated in system 100, and it is to be understood that more or less devices 150 may be utilized depending upon design requirements.

The system described herein allows the computing device's processor(s) 104 to utilize synchronous serial communications in a spatially and electronically distributed system. The SPI management system 100 enables a physically longer connection between local electronics 102 and devices 150, thus increasing the bandwidth and distance limitations for intra-system communications. The synchronous serial communications approach offers precise control of data communications timing in the distributed system due to the synchronous nature of the communications and due to SPI controller's 112 being a designated SPI master. Asynchronous communications modalities typically suffer from latency (of action and return messaging) and timing randomness (jitter), and typically operate at much slower clock rates as compared to synchronous serial communications. Asynchronous communications approach does not have a global clock signal and clock skew is therefore not a problem.

It is contemplated herein that processor 104 may communicate with the SPI controller 112 via shared memory region 106 and/or any other method known in the art, including without limitation, via concepts known as memory ports. Their communications may be coordinated by safe data exchange mechanisms, such as exist in operating systems (i.e., Linux). These exemplary data exchange techniques include without limitation mutexing, handshaking and double buffering. Further, standard interrupt mechanisms to processor interrupts can be added to simplify software response behavior for the system processor 104. It is understood that any like safe data transfer mechanism or data exchange interface device may be implemented to provide support functionality for communications between the system processor 104 and the SPI controller 112.

Each SPI controller 112 preferably includes connecting means 108 to the shared memory region 106 and other connecting means 110 wired to communicate with the SPI cluster electrical interface 116. The SPI controller 112 also has SPI controller memory 114, within which may be stored instructions and/or data for future processing. In use, the SPI controller 112 preferably accesses the shared memory 106 and the SPI controller memory 114, executing instructions found in both and/or storing data in both. The SPI controller 112 is preferably configured to load instructions and/or data from the SPI controller memory 114, or from designated locations within the shared memory block 106. For example, data within the shared memory region 106 may designate a shared memory location and size for the SPI controller 112 to access, and copy to a designated location in the SPI controller memory space 114. The resulting data being copied may include SPI controller instructions and/or data.

This approach enables the system processor 104 to program, configure and control the SPI controller 112. SPI controller 112 receives, via connecting means 110, information originating from devices 150, or SPI native devices 151 (depicted in FIG. 2C). Alternatively, the path of communication may be reversed, and SPI controller 112 may send information to peripheral devices 150. It should be noted that SPI controller 112 communicates with devices 150 via a plurality of SPI interfaces 144 contained within the SPI cluster 140.

According to embodiments of the present invention, SPI cluster 140 preferably includes an SPI bus 142 that is connected to a plurality of SPI interfaces 144. SPI interfaces 144 are communicatively connected to a plurality of devices 150 in a computing system. It should be noted, as shown in FIG. 1, at least some SPI interfaces 144 may be connected to multiple devices 150. At least some devices 150 may be connected to many SPI interfaces 144. For example, two different motor controllers can be connected to the three SPI interfaces on the same SPI cluster. Each of these three SPI interfaces can be on the same SPI cluster, such as SPI cluster 140 and thus share one SPI cluster electrical interface 116 with one SPI controller 112. It is also contemplated herein that in some embodiments the SPI management system 100 could also be utilized with SMBus enabled interfaces, I²C enabled interfaces, or any other synchronous serialized interface known in the art. In these embodiments, SPI cluster 140 would become, for example, a hybrid I²C/SPI or an I²C cluster.

As previously indicated, the computing system's peripheral devices 150 may send and receive digital communication, serial communication, output analog signals that need to be converted to digital format, offer analog outputs that are converted from digital format, perform temperature readings, and the like. These communications are preferably transmitted over SPI bus 142 to SPI cluster electrical interface 116, which is preferably connected to the SPI controller 112.

According to an embodiment of the present invention, SPI cluster electrical interface 116, which may also be referred to as an interconnector, includes two physical interfaces 120, one physical interface 120b is preferably communicatively connected to the SPI interfaces 144 comprising the SPI cluster 140 while the other physical interface 120a is communicatively connected to the SPI controller 112. It should be noted that the physical interface 120a at the SPI controller 112 end of interconnection should be physically compliant with the corresponding SPI controller 112 and not necessarily conformant with standard SPI format(s).

According to an embodiment of the present invention, SPI cluster electrical interface 116 preferably also includes one or more differential-driven wires capable of transferring data in a plurality of binary states. As shown in FIG. 1, this at least one differential driven wire 118 interconnects the physical interfaces 120a and 120b on opposing sides of the SPI cluster electrical interface 116. In various embodiments, the wires 118 within the SPI cluster electrical interface 116 may include, but not limited to, a single state wire, a tri-state wire, a galvanometrically-isolated wire, or other wires as known in the art that can functionally handle the bandwidth and distance requirements in a particular implementation.

SPI cluster electrical interface 116 preferably receives communications from SPI controller 112 via the first physical interface 120a. In some configurations, the first physical interface 120a may translate data so that it may be transmitted reliably over one or more wires 118, which are preferably differential-driven wires. Once data is transmitted to the second physical interface 120b, SPI cluster electrical interface 116 transmits the communications to the SPI cluster 140. It should be noted that in various embodiments one or more wires 118 interconnecting the physical interfaces 120 provide enumerated advantages, such as but not limited to, increased speed of data transmission and lower power consumption by being a low power differential-driven wires, simplified implementation by being a single state wires, cable quality tolerance by being a tri-state wires, voltage level and ground plane noise immunity by being galvanometrically-isolated wires. It is understood that other suitable wires known in the art may also be easily adapted in SPI cluster electrical interface 116. In one embodiment, the first 120a and second 120b physical interfaces are about 22 (twenty-two) inches apart, although it is recognized herein that the separation may be any suitable distance within a computing system, such as, for example, about 10 (ten) inches.

According to an embodiment of the present invention, the first physical interface 120a, communicatively coupled to the local electronics 102, preferably transmits communications via connecting means 110 to the SPI controller 112. The first physical interface 120a converts signaling received from the connecting means 110 to a format required by suitable interface (i.e., differential driven wire) 118 for transit of data to the second physical interface 120b interconnected with the SPI cluster 140. This configuration advantageously enables optimized selection of transit wires 118 within the SPI cluster electrical interface 116 depending on application needs. Upon receiving data, the second physical interface 120b preferably converts signals received from transit wires 118 to standard compliant with the SPI cluster 140, such as SPI (or I2C, SMBus standards, if respective interfaces are used instead of SPI). In one embodiment of the present invention, connecting means 110 may be coupled directly to second physical interface 120b. In other words, if connecting means 110 are compliant with the SPI physical standards and computer system's performance needs then the SPI bus 142 of the SPI cluster 140 can be directly connected to the connecting means 110 of SPI controller 112 without any SPI cluster electrical interface 116.

It should be noted that there is a time delay between communications sent from the SPI controller 112 to the computing system's SPI interfaces 144. This time delay may be caused by the transit wire 118 in the SPI cluster electrical interface 118, the physical interfaces 120, connecting means 110 to and from the SPI cluster electrical interface 116 and/or by other components. According to embodiments of the present invention, because SPI protocol is a synchronous protocol which requires a defined timing for correct operation, the SPI controller 112 advantageously manages and accounts for the transmission delays (also referred to herein as "low level" timing requirements), thus making any delay transparent to the computing system's processing elements and each SPI interface 144. It should be noted that these timing issues are generally in the nanosecond regime.

Further, at least some peripheral devices 150 attached to SPI cluster 140 may have very specific timing requirements that differ for each set of devices. According to embodiments of the present invention, the SPI controller 112 can be programmed to execute a set of commands to meet the timing requirements of these multiple devices 150. These "high level" timing requirements relate to the rapid sequencing and synchronization needs of the devices 150. It should be noted the "high level" timing requirements for devices have typical time scales of fractions of microseconds. Typically, the high level timing functions are programmable while the low level functions are configurable.

Advantages of embodiments illustrated herein include delegation of repetitive operations concerning management of peripheral devices 150 to the SPI controller 112 from other components of computing system. A SPI or similar clocked serial interface contemplated herein enables very efficient and fast serialization of data over a minimal set of wires, for example, 3 (three). SPI protocol allows the entity that drives the clock (the master) to schedule when and how fast a particular SPI interface is queried. In other words, this protocol provides the master absolute control over timing in the system. Advantageously, the ability provided by various embodiments of the present invention to serialize data communication via a cluster of SPI interfaces 144 allows local connections to devices 150 to be made in a space-saving and energy-efficient manner.

It should be noted that typical constraints of conventional clocked interfaces (like SPI) include sensitivity to timing skew, digital drive limitations, and noise sensitivity due to the single ended nature of the interface. Thus, in a conventional SPI system, the distance between any given SPI device and a SPI master directly affects the speed of their communication due to these constraints. Advantageously, architectural design contemplated by various embodiments of the present invention removes the aforementioned SPI system constraints and enables SPI-based communication at full data transmission rates and at substantially longer distances between communicating components of the system. According to embodiments of the present invention, the SPI controller 112 is configured to substantially assure very high quality SPI low-level timing at the SPI cluster 140. Further, the various possible configurations of the SPI cluster electrical interface 116 yields timing skew that impedes the successful roundtrip communication of SPI message communicated between any SPI interface 144 within the SPI Cluster 140 and the SPI controller 112. According to embodiments of the present invention, the SPI controller 112 adapts (via configuration) to any timing skew caused by the SPI cluster electrical interface 116 to ensure success at the maximum transmission rate of each SPI interface 144 and for substantially all SPI standard bit transfer modes. In various embodiments, the SPI controller 112 can switch the bit transfer mode substantially instantaneously in response to changing SPI interface 144 timing requirements. Advantageously, all timing-related limitations of any SPI bus 142 connection can be isolated to the localized SPI cluster 112 implementation.

Figure 2A:
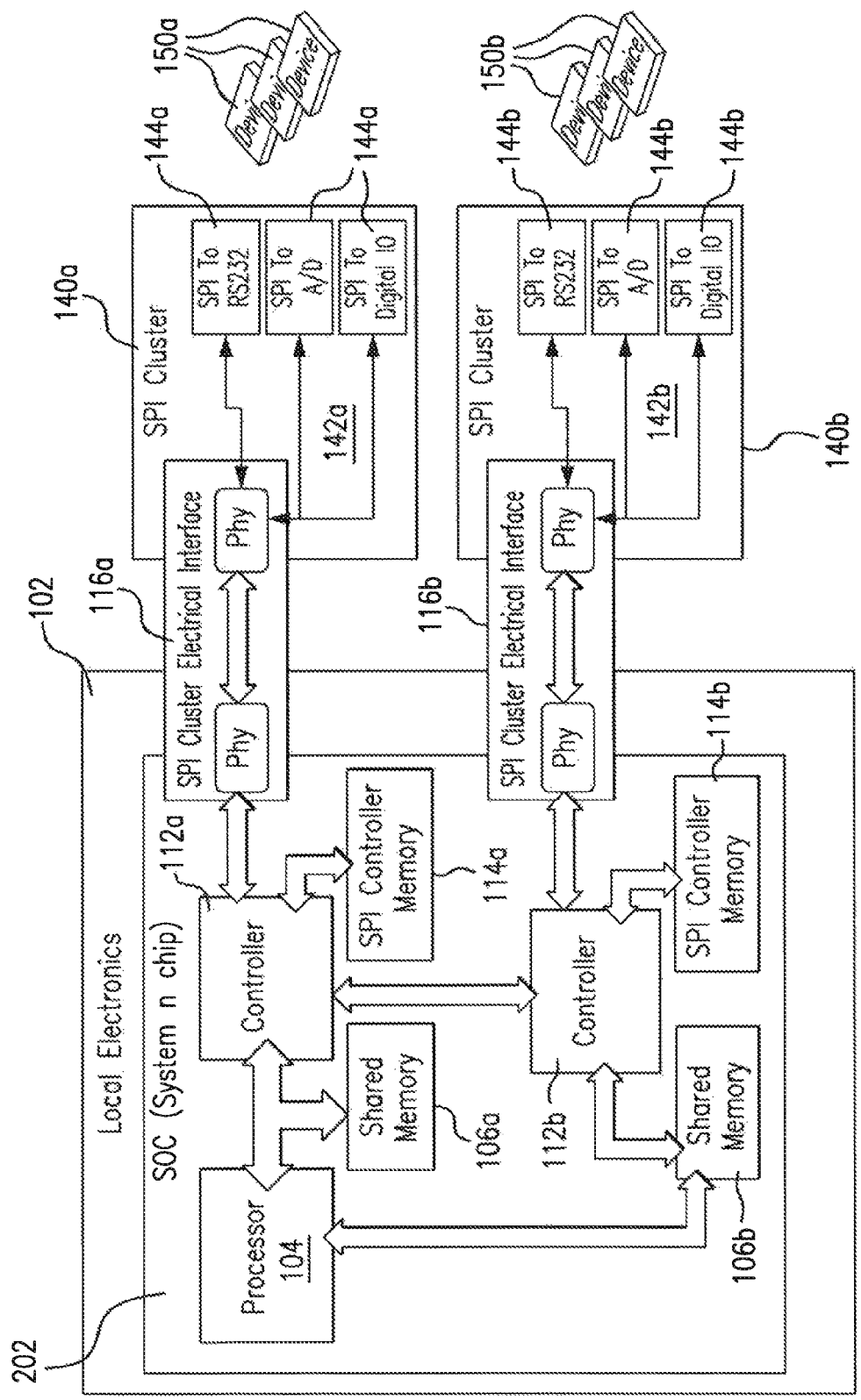
FIG. 2A illustrates a simplified block diagram of an exemplary system-on-chip (SoC) in which embodiments of multiple SPI clusters can be implemented.

FIG. 2A illustrates an example system-on-chip (SoC) 202 in which embodiments of multiple SPI clusters can be implemented. The SoC 202 may be implemented in a fixed or mobile device, such as any one or combination of a consumer, electronic, communication, navigation, media, computing device, and/or other type of electronic device. The SoC 202 can be integrated with electronic circuitry 102, an input-output (I/O) logic control, communication interfaces and components, as well as other hardware, firmware, and/or software to implement a computing device.

In this simplified example, the SoC 202 includes an embedded processor 104 (e.g., any of a microcontroller or digital signal processor). The SoC 202 also includes two distinct SPI controllers 112a and 112b having two respective SPI controller memory regions 114a and 114b. According to an embodiment of the present invention, the processor 104 may communicate with a first SPI controller 114a via a first shared memory region 106a and may communicate with a second SPI controller 114b via a second shared memory region 106b. The SoC 202 can also include various firmware and/or software, such as an operating system (not shown) that is executed by the processor 104.

The SoC 202 includes two distinct SPI controllers 112a-b to interface with two sets of devices or other peripheral components, such as when installed in a computing device. As illustrated in FIG. 2A, a first plurality of devices 150a may be communicatively coupled to a first SPI cluster 140a consisting of a first plurality of SPI interfaces 144a. Similarly, a second plurality of devices 150b may be communicatively coupled to a second SPI cluster 140b containing a second plurality of SPI interfaces 144b. In some embodiments, each SPI cluster 140 a-b may include three SPI interface components 144, including, for example, a SPI to RS232 interface, a SPI to A/D interface and a SPI to Digital IO interface. However, the invention is not limited in this respect, as in some embodiments, different numbers and/or types of interface components may be used for each of SPI clusters 140 a-b. It should be noted that in some embodiments, the first SPI cluster 140a and the second SPI cluster 140b may be located in different areas within the computing device. Each SPI cluster 140 a-b also includes a corresponding data bus 142 a-b that couples the various SPI interfaces 144 a-b for data communication with other components of the computer system. The data buses 142a and 142b of SPI clusters 140a and 140b can be implemented as three-wire (plus enablement signal) SPI data buses.

According to various embodiments of the present invention, a single SPI controller manages a single SPI cluster. Accordingly, as shown in FIG. 2A, a first SPI controller 112a may be communicatively coupled to a first SPI cluster 140a via a first SPI cluster electrical interface 116a and a second SPI controller 112b may be communicatively coupled to a second SPI cluster 140b via a second SPI cluster electrical interface 116b. As described above with reference to FIG. 1, each SPI cluster electrical interface preferably includes a pair of physical interfaces at opposing ends interconnected by one or more wires. In various embodiments, the wires within the first and second SPI cluster electrical interface 116a-b may include, but not limited to, a single state wire, a tri-state wire, a galvanometrically-isolated wire, or other wires as known in the art that can functionally handle the bandwidth and distance requirements in a particular implementation. Advantageously, the first and second SPI cluster electrical interface 116a-b may have implementations different from each other depending on distances between corresponding pairs of SPI controllers 112a-b and SPI clusters 140a-b and/or depending on high-level timing requirements of corresponding first and second pluralities (150a and 150b) of peripheral devices managed by the SPI controllers 112a-b.

Figure 2B:
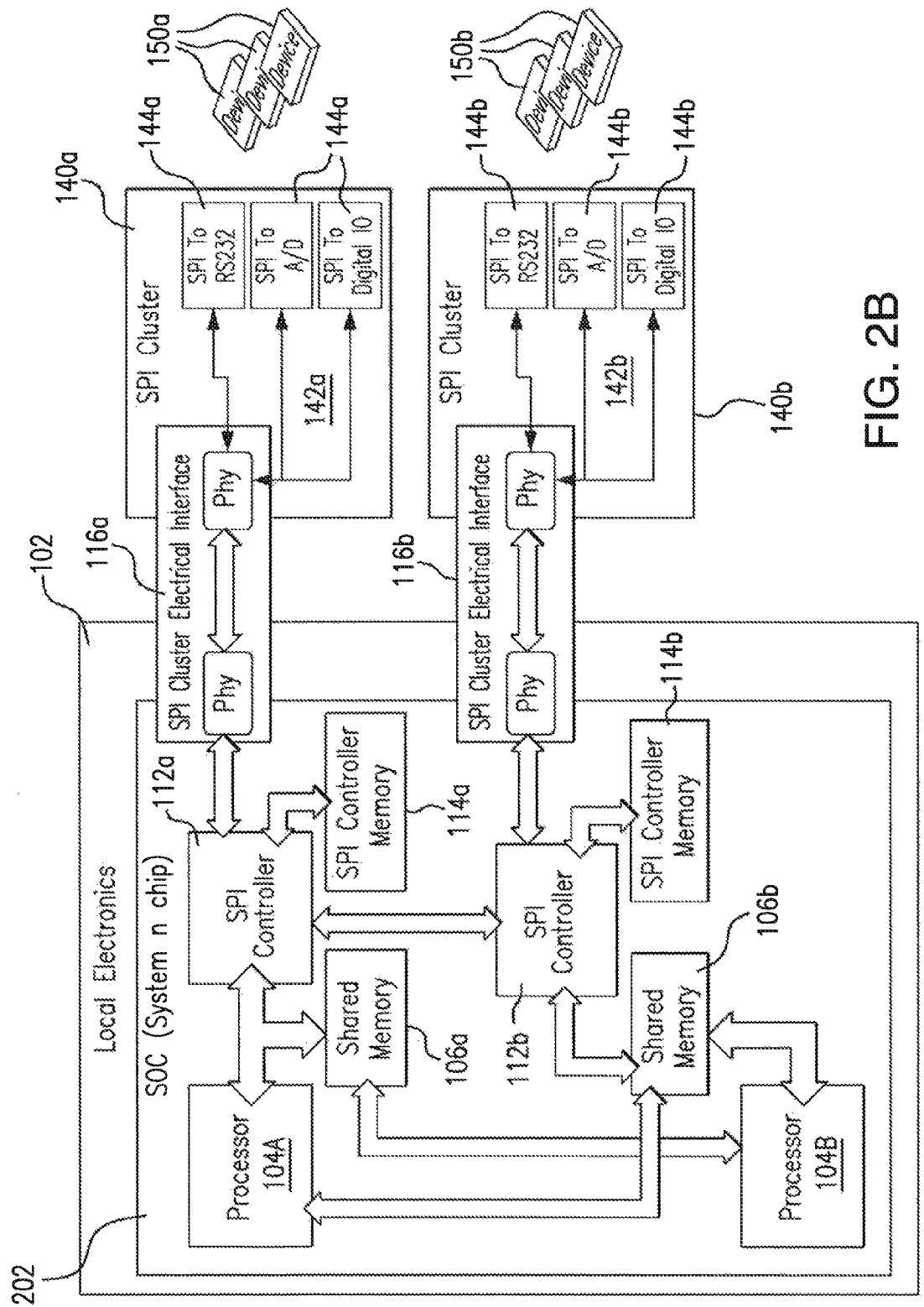
FIG. 2B illustrates a simplified block diagram of a multi-core SoC in which two or more SPI clusters may be integrated with cores on the multi-core SoC.

FIG. 2B illustrates a simplified block diagram of a multi-core SoC in which two or more SPI clusters 140a-b may be integrated with cores on the multi-core SOC 202. A multi-core processor is a processing system having two or more independent cores integrated onto a single integrated circuit die (known as a chip multiprocessor or CMP) or onto multiple dies in a single chip package. For example, a dual-core processor contains two cores, a quad-core processor contains four cores, and so on. The cores in a multi-core processor may or may not be identical in terms of design, operation or architecture, but even with homogeneous multi-core systems where the cores are identical, there will be differences in operating frequency for the different cores. FIG. 2B illustrates a dual-core processor having a first processor 104a and a second processor 104b which may communicate with each other in some embodiments. Similarly to FIG. 2A, the SoC 202 includes the first SPI controller 112a interconnected with the first SPI cluster 140a via the first SPI cluster electrical interface 116a and the second SPI controller 112b interconnected with the second SPI cluster 140b via the second SPI cluster electrical interface 116b. According to embodiment shown in FIG. 2B, each processor 104a-b may have access to both a first shared memory region 106a and a second shared memory region 106b in order to communicate with both the first SPI controller 112a and the second SPI controller 112b, respectively. While only two SPI controllers 112a and 112b are shown in FIG. 2B, this invention is not so limited. In various embodiments, the SoC 202 may have different numbers of SPI controllers 112 depending on how many SPI clusters 140 are utilized in a particular implementation. For example, in one embodiment, dual-core SoC may include ten SPI controllers integrated on the same chip.

Figure 2C:
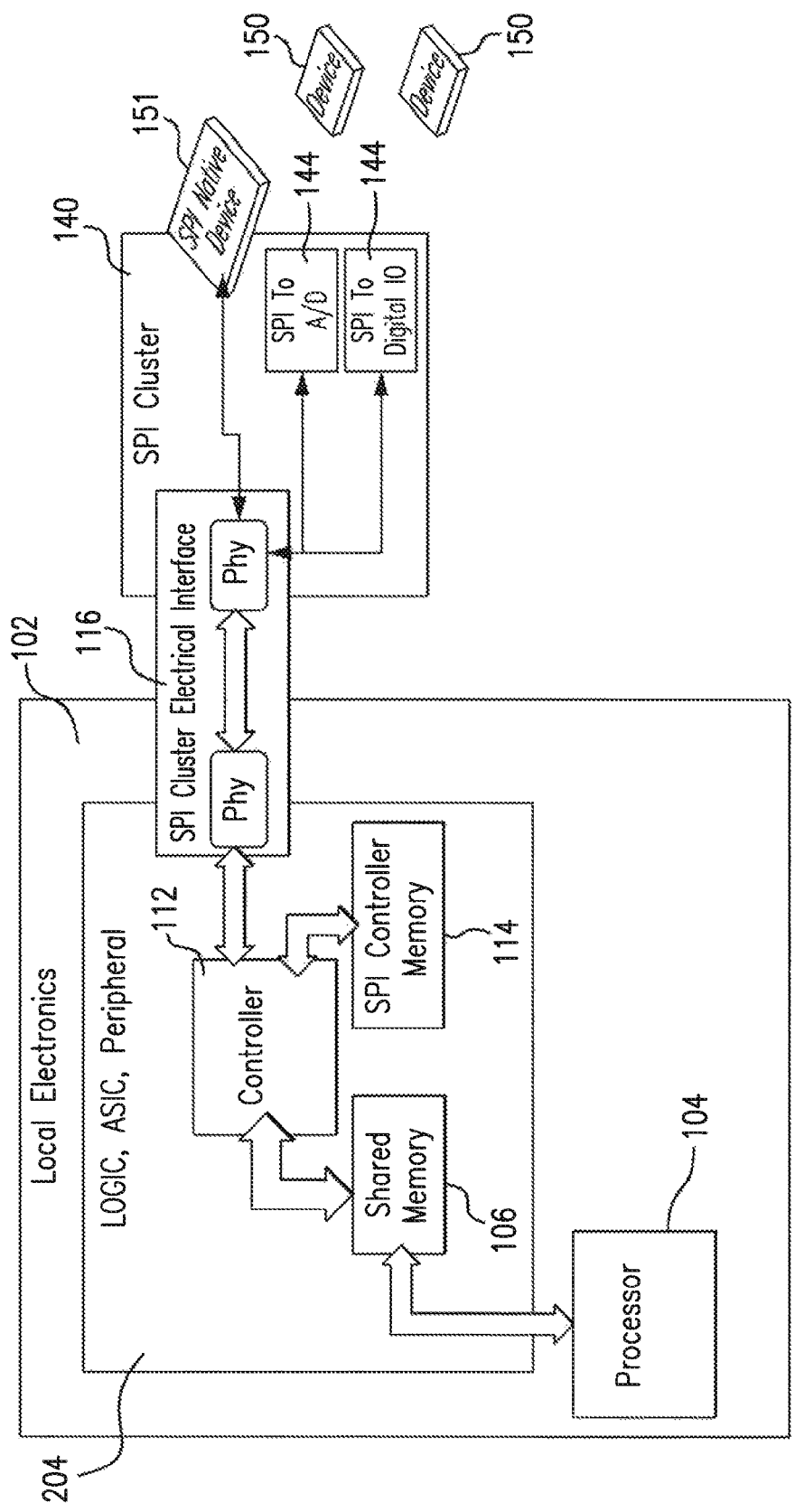
FIG. 2C illustrates a simplified block diagram of an external processor configuration in accordance with another embodiment of the present invention.

FIG. 2C illustrates a simplified block diagram of an external processor configuration in accordance with another embodiment of the present invention. The integrated circuit 102 shown in FIG. 2C includes an application specific programmable logic device 204. Programmable logic devices are a well-known type of integrated circuit that can be programmed to perform specified logic functions. In various embodiments, programmable logic device 204 may include without limitation an Application Specific Integrated Circuit ("ASIC"), field programmable gate array ("FPGA"), configurable logic block and the like. In one embodiment, programmable logic device 204 may include SPI controller 112 configured to execute commands in SPI controller memory 114. In addition, programmable logic device 204 may include shared memory region 106. In the configuration illustrated in FIG. 2C, the processor 104 is disposed on the same integrated circuit 102 but externally to programmable logic device 204. Similar to previously described embodiments, the processor 104 may communicate with the SPI controller 112 by accessing the shared memory block 106 on the programmable logic device 204. As illustrated in FIG. 2C, the SPI cluster electric interface 116 may directly interconnect SPI cluster 140 with the programmable logic device 204.

Additionally, a SPI native device 151 is depicted in FIG. 2C to illustrate alternative connection possibilities. Since the native device 151 is compliant with SPI protocol, there is no need to have a device specific interface in the SPI cluster 140. In other words, the SPI native device 151 may be connected directly to the SPI bus 142 of SPI cluster 140.

Figure 2D:
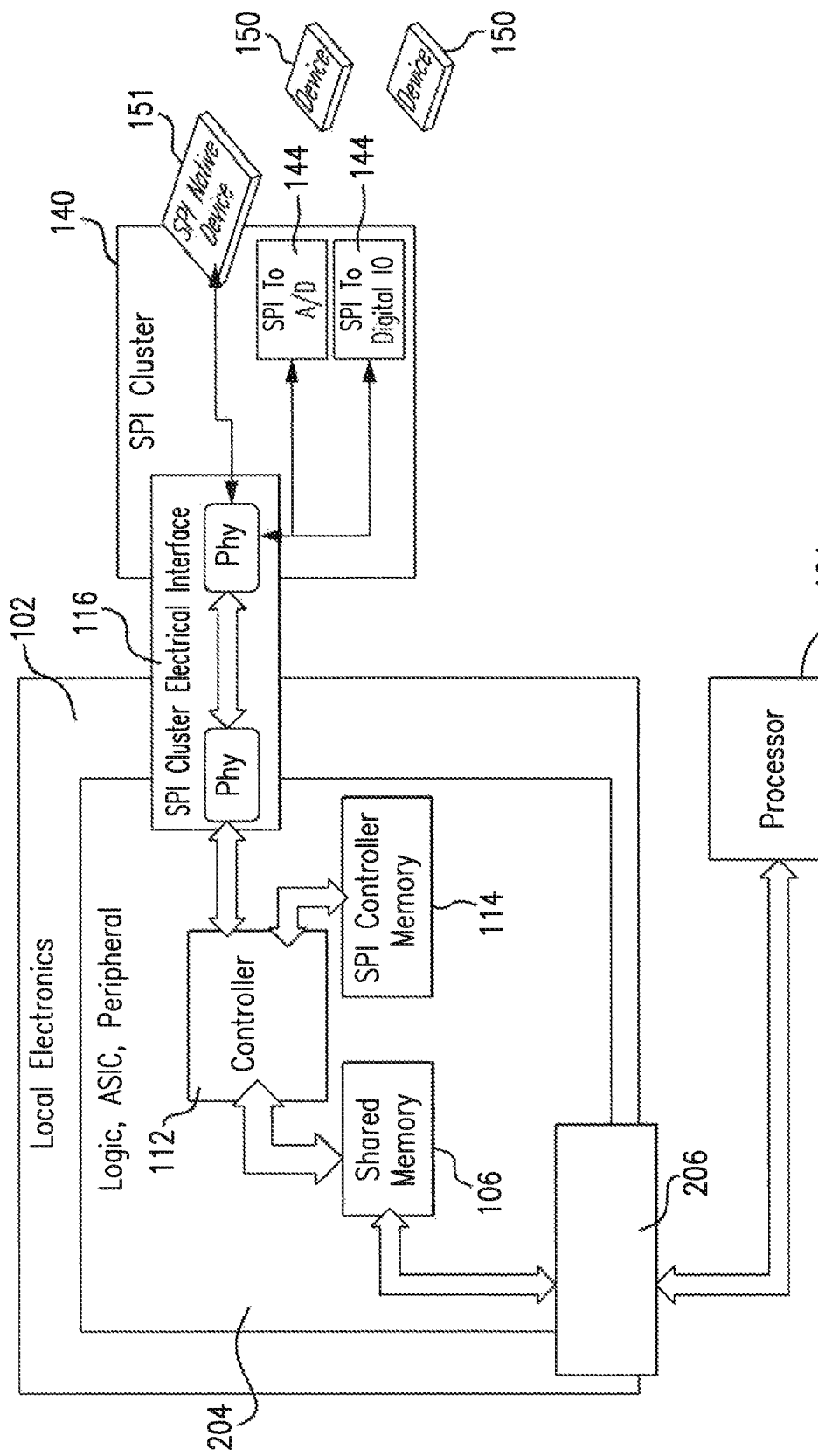
FIG. 2D illustrates yet another configuration in accordance with yet another embodiment of the present invention.

FIG. 2D illustrates yet another configuration in accordance with an alternative embodiment of the present invention. In this embodiment, control of the programmable logic device 204 may be performed by the processor 104 located externally to the logic device 204 and located externally to the integrated circuit 102. It should be noted that at least in some embodiments the remote processor 104 may be coupled to the programmable logic device 204 via a SPI-enabled Ethernet controller 206, for example.

Figure 3:
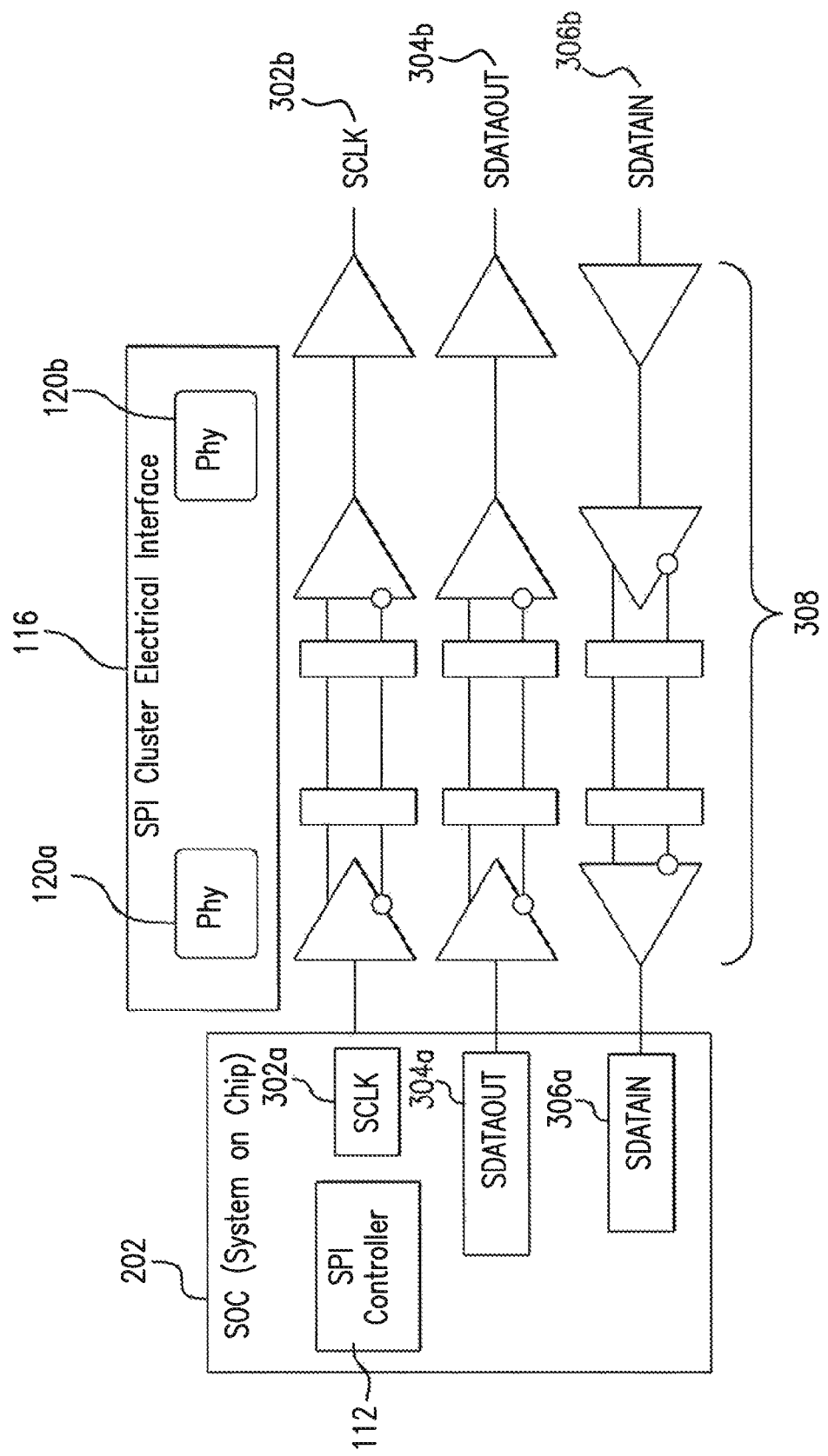
FIG. 3 is a diagram showing an illustrative SPI cluster electrical interface, according to an embodiment of the present invention.

FIG. 3 is a diagram showing an illustrative SPI cluster electrical interface 116, according to an embodiment of the present invention. As previously indicated, in some embodiments, the SPI cluster electrical interface 116 interconnects the SPI controller 112 disposed on the SoC 202 with a SPI cluster (not shown in FIG. 3), which may be located a substantial distance away from the SoC 202. SPI cluster electrical interface 116 includes two physical interfaces. A first physical interface may be communicatively coupled to the SPI controller 112, while a second physical interface 120b on the opposite end may be connected to a SPI cluster. SPI protocol specifies three signals SCLK (serial clock), SDATAIN (serial data in) and SDATAOUT (serial data out). It is, however, to be appreciated that alternative naming conventions are also widely used. As shown in FIG. 3, a serial clock signal input 302a of the first physical interface 120a is connected to serial clock signal input 302b of the second physical interface 120b. Similarly, SDATAIN 306a of the first physical interface 120a is connected to SDATAIN 306b of the second physical interface 120b and SDATAOUT 304a of the first physical interface 120a is connected to SDATAOUT 304b of the second physical interface 120b.

In one embodiment, the first physical interface 120a and second physical interface 120b may include differential drivers. Low Voltage Differential Signaling ("LVDS") is a method for high-speed serial transmission of binary data over a copper transmission line (wire). It is widely adopted in telecom equipment because of its immunity to crosstalk noise, low electromagnetic interference and low power dissipation. A single-ended interface is the most common and simplest implementation for data transfer. However, a differential interface can increase bandwidth, minimize power and noise generation as compared to a single ended interface. Thus, in one embodiment, the first physical interface 120a may comprise single ended to differential LVDS converter. At the opposite end, the second physical interface 120 b may comprise differential signal to single ended interface converter. It should be noted, the second physical interface 120b may support a wide common mode voltage range (a rail-to-rail common voltage range, e.g., 0V to 3.3V) and may support a plurality of standards. In some embodiments, second physical interface 120b may include circuits for providing electrical isolation circuits, including optical isolation circuits, which are compatible with the SPI communication protocol. It should be noted that SPI cluster electrical interface 116 may include additional circuitry 308. For example, various connectors shown in FIG. 3 may add capacitance to the illustrative SPI cluster electrical interface 116.

Figure 4:
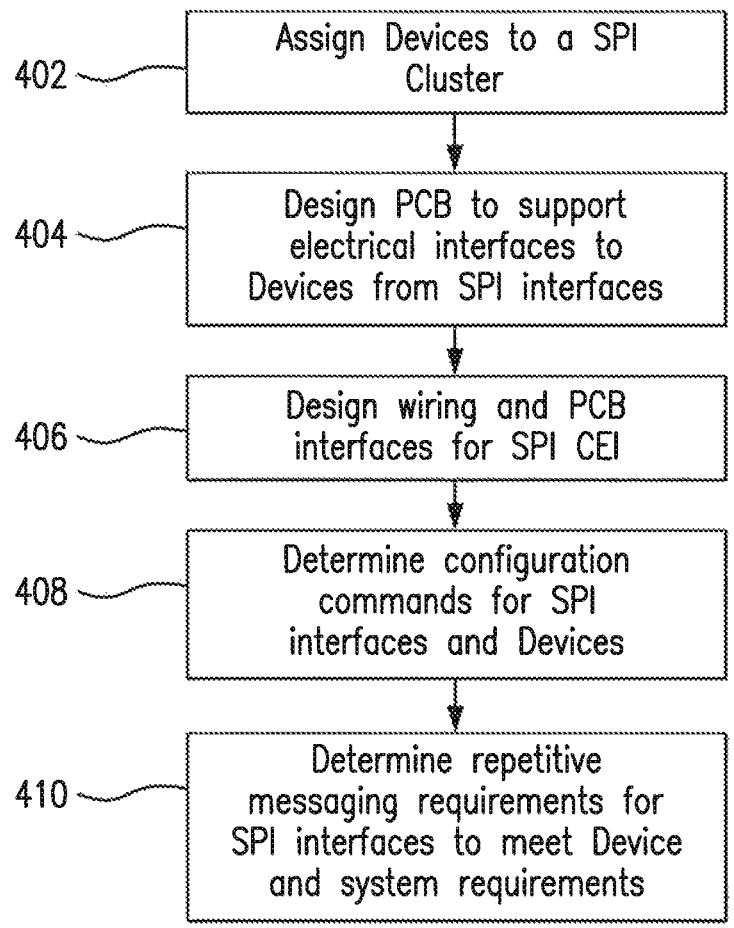
FIG. 4 is a flow diagram of steps performed during an exemplary electronics design phase for using an SPI controller in a computer system, in accordance with an embodiment of the present invention.

Turning now to FIG. 4, FIG. 4 illustrates an exemplary electronics design phase for using an SPI controller in a computer system, in accordance with an embodiment of the present invention. In this example, the term "system designer" is used, but this term may refer to a person, a design tool, a software tool, etc., such as a hardware designer, a compiler, a synthesis tool, etc., that can perform the corresponding steps. Further, in this example, an assumption is made that a system designer intends to integrate SPI cluster 140 with a SOC containing programmable logic device 204 (as shown in FIG. 2C). This system needs to access a plurality of peripheral devices 150.

At 402, a system designer preferably determines which devices are to be connected to an instance of an SPI cluster based on the system requirements, operational capability of each respective peripheral device and the relative physical proximity with respect to each other. This step further involves identifying physical interfaces (i.e. RS232, Digital IO, etc.) for all selected devices and constructing a local grouping of the identified physical interfaces. Further, at 402, the system designer identifies SPI interfaces (i.e., SPI to RS232, SPI to Digital I/O, etc.) needed to support the identified physical interfaces.

At 404, the system designer preferably designs a printed circuit board ("PCB") for the SPI cluster instance. In various embodiments of the present invention illustrated in FIGS. 1 and 2A-2D, the SPI cluster PCB 140 includes the electronic interfaces needed for communication between the identified SPI interfaces 144 and the peripheral devices assigned to the SPI cluster 140. In addition, SPI cluster PCB 140 preferably includes an SPI conformant interface for communication with SPI cluster electrical interface 116.

At 406, the system designer preferably designs SPI cluster electrical interface 116 described above with reference to FIG. 3. In an embodiment of the present invention, the system designer designs SPI cluster electrical interface 116 based on the system level requirements for communication between SPI cluster 140 and the SOC. It should be noted that the selected design of the SPI cluster electrical interface 116 substantially determines the timing skew that may result from, for example, data transmission between the SPI controller 112 and the SPI cluster 140. The system designer preferably designs SPI cluster electrical interface 116 to meet all of the system needs for distance, voltage domain transition, connector architecture, conducted and radiated electromagnetic susceptibility and emission, and "general noise", amongst many other needs. Each intermediary component on the SPI cluster electrical interface 116 adds time that may cause substantial timing violations. The system designer preferably designs the SPI cluster electrical interface 116 to mitigate, minimize or remove noise. The noise management in the SPI cluster electrical interface 116 design is reduced to controlling the quality of the signal (signal to noise). Since the SPI controller 112 preferably compensates for any timing skew the designer is essentially unconstrained in application of a clocked, synchronous serial interface protocol. Various embodiments of the present invention contemplate that, advantageously, the clocked serial interface can be utilized in domains that are typically occupied by asynchronous serial interfaces, thus substantially removing latency issues substantially reducing implementation complexity.

With respect to peripheral devices 150, typically each device has a corresponding sequence of signals that configures and/or starts (initializes) the device. In accordance with an embodiment of the present invention, this sequence of signals is implemented utilizing a plurality of SPI interfaces 144. Thus, at 408, the system designer preferably determines the required initialization and configuration commands and preferably configures SPI interfaces 144 of SPI cluster 140 to generate one or more sequences of signals for each corresponding device 150. In one embodiment, these one or more sequences may comprise an initialization routine which may be run on the SPI controller 112 in a "pass through" mode, so that commands that are received from either collocated or external processor 104 "pass-through" to the SPI controller 112 for execution. In this example, these pass-through commands are in the form of SPI commands thus making the SPI controller 112 to appear like a standard SPI peripheral device to the processor 104. Programs executed by the processor 104 and/or the SPI controller 112 often include two components: an initialization routine (e.g., a compiled set of instructions from the initialization code) and a main routine (e.g., a compiled set of instructions from the main code). Initialization code may be generated by a high-level language compiler into the embedded system programming. The length of the initialization code may be substantial and, in some examples, the initialization code can be similar in length or may even substantially exceed the main code.

At 410, the system designer preferably identifies a plurality of repetitive messages that are sent to a plurality of peripheral devices 150. Such repetitive messages may include, but not limited to, the runtime routines that perform various tasks related to management and/or query of peripheral devices 150 connected to the SPI cluster 140. Advantageously, these routines form the basis of main routine code, which may be executed repeatedly by the SPI controller 112 without the oversight of the processor 104. The main code may be loaded into the SPI controller execution memory space 114 by the processor 104, as described below. According to an embodiment of the present invention, the SPI controller 112 is preferably configured to place the results of the main code execution into designated shared memory locations accessible by the processor 114. In summary, at 410, the system designer preferably designs and enumerates a runtime sequence of repetitive commands/ routines that are to be executed against the plurality of SPI interfaces 144 to control peripheral devices 150. At least in some embodiments, the system designer preferably also includes one or more test routines into the main code executable by the SPI controller 112.

Figure 5:
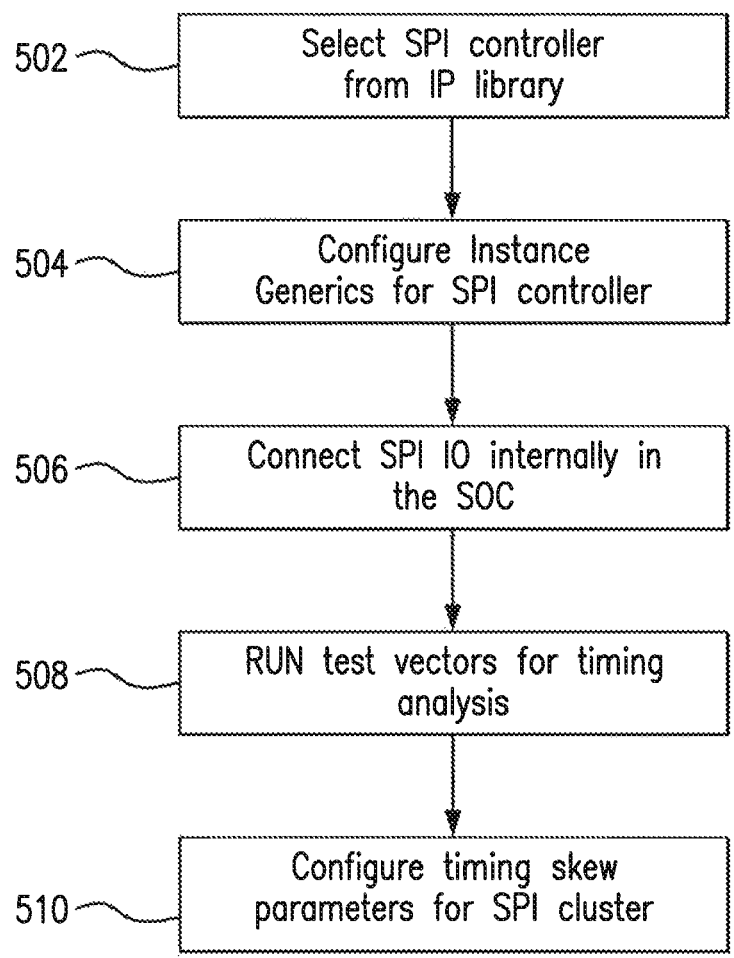
FIG. 5 is a flow diagram of steps of an exemplary process of adding an SPI controller to a computer system, in accordance with an embodiment of the present invention.

FIG. 5 is a flow diagram of steps of an exemplary process of adding an SPI controller to a computer system, in accordance with an embodiment of the present invention. FIG. 5 includes steps performed by the system designer to add an instance of SPI controller 112 to programmable logic device 204, which may include without limitation an ASIC, FPGA, configurable logic block and the like. At, 502, the system designer preferably selects SPI controller from IP library. As used herein, the term "IP" generally refers to intellectual property which includes, without limitation, IC designs, methods, processes, schematics, code, hardware description language models, configurations ("builds"), scripts, logic level representations, and software objects and components (and their descriptions), which may be used or generated by the system designer. As used herein, the term "IP library" generally refers to a repository for the definitions of IP components. Such repository may be of literally any form which is accessible to one or more users.

At 504, the system designer may configure instance parameters associated with an SPI controller instance. In various embodiments this configuration step may include, without limitation, setting up the memory 114 (e.g., memory size) associated with SPI controller 112, wherein the memory 114 has such structural and functional features as to afford significant enhanced performance of SPI controller 112, designating shared memory 106 sizes and locations accessible by both SPI controller 112 and processor 104, and the like.

At 506, the system designer preferably connects SPI controller connecting means 110 to other physical wires in the programmable logic device 204. In one embodiment, in this step the system designer may generate a design flow. The generated design flow may vary depending on the type of IC being designed. For example, a design flow for building an ASIC will differ from a design flow for designing a FPGA component. Design structure is an input to a design process and may come from an IP provider. Design structure comprises circuit 202 in the form of schematics or a hardware-description language (HDL) (e.g., Verilog, VHDL, C, etc.). Design structure may be on one or more of machine readable medium. For example, design structure may be a text file or a graphical representation of circuit 202. In some embodiments design structure may contain a timeplate definition statement, may describe the IC input, output, and bidirectional pins as well as specify certain pin types such as clock, enable, etc. (The term "pin" is used herein broadly to mean any type of suitable connection). This design structure may also define default SPI cluster electrical interface 116 clocking skew parameters based on the step 406. Design process synthesizes (or translates) circuit 202 into a netlist, where the netlist is, for example, a list of interconnects, transistors, logic gates, control circuits, I/O, models, etc. and describes the connections to other elements and circuits in an integrated circuit design and recorded on at least one of machine readable medium. Thereupon, detailed placement and routing processes may be used to complete the IC layout.

According to an embodiment of the present invention, at 508, the system designer preferably performs functional verification and physical timing verification by running test vectors. The functional verification of the programmable logic device 204 is concerned with ensuring a high degree of confidence in the functional quality and integrity of the logic device 204. More specifically, the functional verification includes extensive testing to diagnose any discrepancies between the design of the programmable logic device 204 and intended functional behavior that affect the performance and electrical characterization of the logic device 204. In functional verification, an important metric to monitor is test coverage which is a measure of the completeness of the test suite with respect to a particular hardware platform. In order to maximize test coverage and minimize the amount of manual tuning, a verification tool, such as a test generator, is sometimes employed. The test generator employing a verification technique may include a test suite that is comprised of a plurality of test vectors. The test vectors may be developed using a variety of simulation-based verification techniques such as hand-coded test generation, pseudo-random test generation, or template-based test generation. For example, the system designer, with an intimate understanding programmable logic device 204, may write a very powerful and yet small set of hand-coded test vectors that are very effective in exercising the design. Accordingly, in one embodiment, step 508 includes receiving a timing analysis report generated from logic device 204 design. The timing analysis report preferably includes timing information corresponding to an arrival time of signals conveyed on signal paths in the SPI management system 100.

In a preferred embodiment, at 510, the system designer may configure timing skew parameters associated with SPI controller 112 to reduce a slew of timing delays corresponding to both SPI cluster 140 and SPI cluster electrical interface 116 based upon physical implementations thereof. In one embodiment, this step may involve configuring SPI controller 112 to create a programmable delay line for a controllable delay in the SPI management system 100 based on the timing analysis performed at 508.

Figure 6:
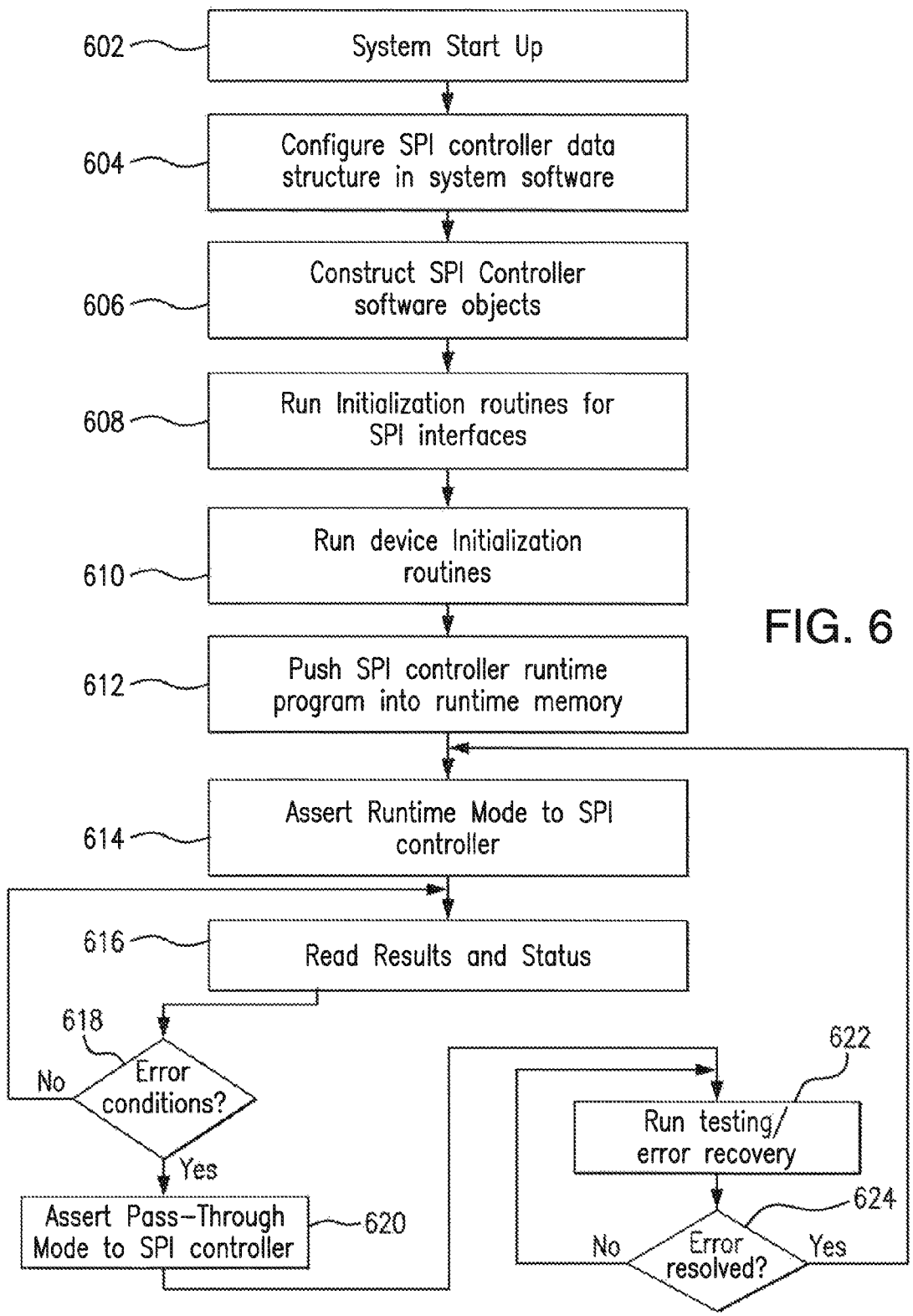
FIG. 6 is a flow diagram of steps of an exemplary process of using an SPI controller in a computer system, in accordance with an embodiment of the present invention.

FIG. 6 is a flow diagram of steps of an exemplary process of using an SPI controller in a computer system, in accordance with an embodiment of the present invention. At 602, conventional startup preferably resets SPI management system 100 to an initial state. At 604, the processor 104 may configure SPI controller's 112 data structure. In one embodiment, at 604, the processor 104 may load into the SPI controller's 112 data structure a plurality of device drivers that correspond to the plurality of peripheral devices 150. In addition, at 604, the processor 104 may add configuration data pertinent to SPI timing information to the SPI controller's 112 data structure. Furthermore, in some embodiments, the processor 104 may perform additional steps to ensure proper set-up, access to and operation of the SPI controller instance 112.

In one embodiment, at 606, the SPI controller 112 may utilize an IP library comprising a library of high level software objects that abstract hardware details of the peripheral devices 150 as well as abstracting at least some communication protocol details. For example, at this step, to carry out asynchronous serial data transmission, the SPI controller 112 may load from the library one or more software objects to control an output line to be transmitted at specified by the asynchronous hardware protocol timings and called "bit-banging". In some embodiments, these software objects may include high level functions, such as, but not limited to, "set digital I/O bit", "write CAN message", "read serial FIFO bytes," and the like. It should be noted that these software objects may comprise easily reusable objects from which new functionality can be composed. At least in some embodiments, the processor 104 may construct and pass suitable software objects to the SPI controller 112 via the SPI controller's 112 data structure configured in step 604.

According to an embodiment of the present invention, at 608 and 610, the SPI controller 112 preferably utilizes the software objects described above with respect to step 606 to run the initialization routine defined by the system designer and described above with respect to step 408 of FIG. 4. In one embodiment, the plurality of SPI interfaces 144 contained within the SPI cluster 140 may be configured by the aforementioned initialization routine executed by the SPI controller 112 at 608. At 610, upon completing initialization of SPI interfaces 144, the initialization routine executed by the SPI controller 112 preferably initializes and configures the plurality of peripheral devices 150 connected to the SPI cluster 140.

Next, at 612, the processor 104 may read a file containing code of the SPI controller's 112 main routine (also described above with respect to step 408 of FIG. 4) and may load the main routine code into the SPI controller's memory region 114, according to an embodiment of the present invention.

At 614, responsively to having loaded the main routine into the SPI controller's memory region 114, the processor 104 preferably asserts a runtime mode of the SPI controller 112 via a shared memory 106 command, so as to cause the SPI controller 112 to start executing the main routine. In other words, at 614, the SPI controller 112 starts to process the information written/read to/from one or more peripheral devices 150. In one embodiment, during execution of the main routine, the SPI controller 112 may read data values from the shared memory region 106, may incorporate these read data values into commands understood by a target peripheral device and may transmit the created command to the target peripheral device. Upon receiving a corresponding response, the SPI controller 112 may decode the received information. Next, the SPI controller 112 may push the received and decoded results back to the processor 104 via the shared memory 106, for example. In one illustrative embodiment, the target peripheral device may comprise one or more torque drive devices and the SPI controller's 112 main code may include instructions to write and report torque values corresponding to multiple motors simultaneously. In this non-limiting example, the data values requested by the SPI controller 112 may comprise two axis torque values.

Next, the SPI controller 112 may generate a command compliant with the protocol understood by a specific SPI interface 144 directly interconnected with the one or more target torque drive devices. At least in some embodiments, the main routine executed by the SPI controller 112 may further include code to synchronize messages transmitted to the target devices (i.e., torque drive devices), to decode results received from the peripheral devices and to place the measured torque value results back into the specified shared memory 106 locations known to and accessible by the processor 104. Therefore, advantageously, the SPI controller 112 described herein reduces processor's 104 efforts to communicate with one or more peripheral devices to a few shared memory read and write operations compared to potentially few hundred operations, such as, but not limited to, message formatting operations, control byte transmission operations, and the like that would be needed to be performed by a processor in a conventional system lacking a corresponding SPI controller.

According to an embodiment of the present invention, at 616, the processor 104 may read the measured results, status codes, among other data from the shared memory 106 in order to determine whether any error conditions are present, at step 618. In response to detecting one or more errors (step 618, yes branch), at 620, the processor 104 may stop the execution of the main routine by stopping the runtime mode of the SPI controller 112 via a corresponding shared memory 106 command and may assert a highly interactive pass-through mode of SPI controller 112 operation, which preferably allows the processor 104 to communicate directly to the SPI cluster 140.

At step, 622, the SPI controller 112 operates in the pass-through operating mode under substantially complete control of the processor 104. During the pass-through operating mode, the SPI controller 112 allows the processor 104 to run one or more pre-configured testing and/or error recovery routines. At 624, the processor 104 may determine whether the one or more detected error conditions have been successfully resolved. In response to determining that all error conditions detected at 618 have been successfully resolved (step 624, yes branch) the processor 104 may return back to step 614 in order to re-assert the runtime mode of the SPI controller 112 via a shared memory 106 command. At this point, the SPI controller 114 may resume the execution of the main routine until next one or more error conditions will be detected by the processor 104.

In summary, advantages of embodiments illustrated herein include delegation of repetitive operations concerning management of peripheral devices 150 to the SPI controller 112 from other components of computing system. The timing skew compensation offered by the SPI controller 112 addresses a general weakness in serial synchronous communications. This ability to compensate for timing skew is greatly enhanced in view of the programmability of the SPI controller 112. The skew control provided by the SPI controller 112 enables greater communications speed. Further, as discussed above, various embodiments contemplate that that the processor 104 can configure the SPI interfaces 144 of SPI cluster 140 and/or peripheral devices 150 using standard software approaches, then load an executable program instructions into the SPI controller's memory 114 and allow the SPI controller 112 to perform the repetitive tasks without processor's 104 oversight. This approach, advantageously, greatly reduces overhead on the processor(s) 104 while effectively and efficiently maintaining necessary internal computer-system communications performance.

The techniques described herein are exemplary, and should not be construed as implying any particular limitation of the certain illustrated embodiments. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A Serial Peripheral Interface (SPI) management system for use within a computer system, the SPI management system comprising:
   a processor;
   a shared memory;
   an SPI cluster including a plurality of SPI interfaces connected to one or more peripheral devices in a computer system, wherein at least one SPI interface is connected to more than one peripheral device and wherein at least one peripheral device is connected to more than one SPI interface; and
   an SPI controller communicatively connected with the SPI cluster via an SPI cluster electrical interface and communicatively connected with the processor via the shared memory, the SPI controller configured to run an initialization routine to initialize and configure the plurality of SPI interfaces and to initialize and configure the one or more peripheral devices and wherein the SPI controller is configured to manage communication between the processor and the one or more peripheral devices and configured to dynamically adapt to timing skew caused by routing of signals between the processor and the one or more peripheral devices by dynamically switching bit transfer modes.

2. The SPI system of claim 1, wherein the SPI cluster electrical interface comprises a first and second physical interfaces, the first physical interface being communicatively connected to the SPI cluster, and the second physical interface being communicatively connected to the SPI controller.

3. The SPI system of claim 2, wherein the SPI cluster electrical interface further comprises a wire that communicatively connects the first and second physical interfaces.

4. The SPI system of claim 3, wherein the SPI cluster electrical interface's wire is differentially driven and galvanometrically coupled.

5. The SPI system of claim 1, wherein the processor comprises an embedded controller.

6. The SPI system of claim 1, wherein the SPI system comprises a first SPI controller, a second SPI controller, a first shared memory region, and a second shared memory region, and wherein the processor communicates with both the first SPI controller and the second SPI controller via the first shared memory region and the second shared memory region, respectively, and wherein the first and second SPI controllers are each communicatively connected to separate SPI clusters via a first SPI cluster electrical interface and a second SPI cluster electrical interface, respectively.

7. The SPI system of claim 1, wherein the SPI system comprises a first processor, a second processor, a first SPI controller, a second SPI controller, a first shared memory region, and a second shared memory region, and wherein the first processor communicates with the first SPI controller via the first shared memory region, wherein the second processor communicates with the second SPI controller via the second shared memory region, and wherein the first and second SPI controllers are each communicatively connected to separate SPI clusters via a first SPI cluster electrical interface and a second SPI cluster electrical interface, respectively.

8. The SPI system of claim 1, wherein said SPI controller is formed in an integrated circuit operatively mounted on a system board and said shared memory is internal to said integrated circuit and wherein said processor is disposed on the said system board externally to said integrated circuit.

9. The SPI system of claim 8, wherein said processor is disposed externally to said system board.

10. A method for utilizing an SPI controller in an SPI management system comprising a processor, a shared memory, an SPI cluster including a plurality of SPI interfaces connected to one or more peripheral devices and the SPI controller communicatively connected with the SPI cluster via an SPI cluster electrical interface, the method comprising the steps of:

configuring, by a processor, an SPI controller configuration data structure;

running, by the SPI controller, one or more initialization routines to initialize and configure the plurality of SPI interfaces and to initialize and configure the one or more peripheral devices, wherein at least one SPI interface is connected to more than one peripheral device and wherein at least one peripheral device is connected to more than one SPI interface;

sending, by a processor, a command to the SPI controller requesting the SPI controller to execute a plurality of program instructions to manage communication between the processor and the one or more peripheral devices;

executing, by the SPI controller, the plurality of program instructions responsive to receiving the command; and dynamically adapting, by the SPI controller, to timing skew caused by routing of signals between the processor and the one or more peripheral devices by dynamically switching bit transfer modes.

11. The method of claim 10, wherein the plurality of program instructions comprises program instructions to process one or more requests from the processor to obtain data from the one or more peripheral devices, program instructions to process one or more responses from the one or more peripheral devices containing the requested data and program instructions to pass the requested data and one or more communication status codes to the processor via the shared memory region accessible by both the processor and the SPI controller.

12. The method of claim 11, further comprising the step of:

detecting, by a processor, one or more error conditions based on the passed one or more communication status codes.

* * * * *